Feb. 26, 1952 — A. A. BERNARD — 2,586,907
PORTABLE SHAPE CUTTER
Filed June 3, 1948 — 3 Sheets-Sheet 1
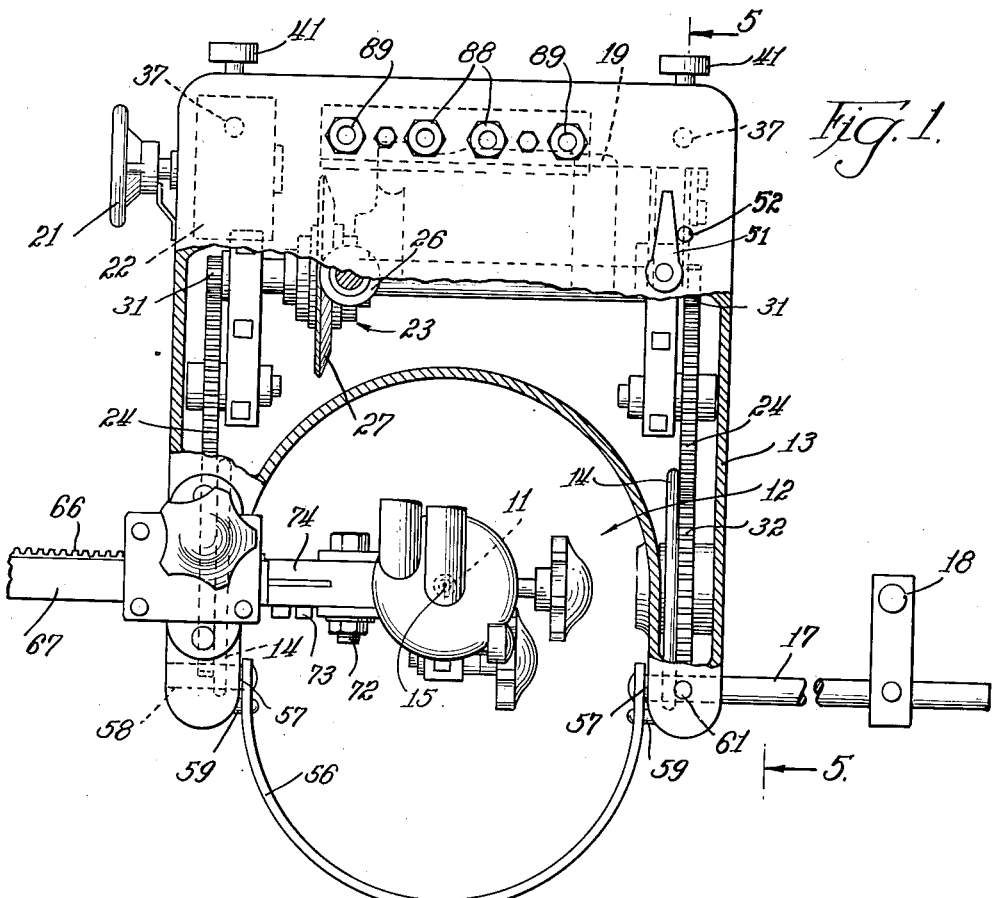
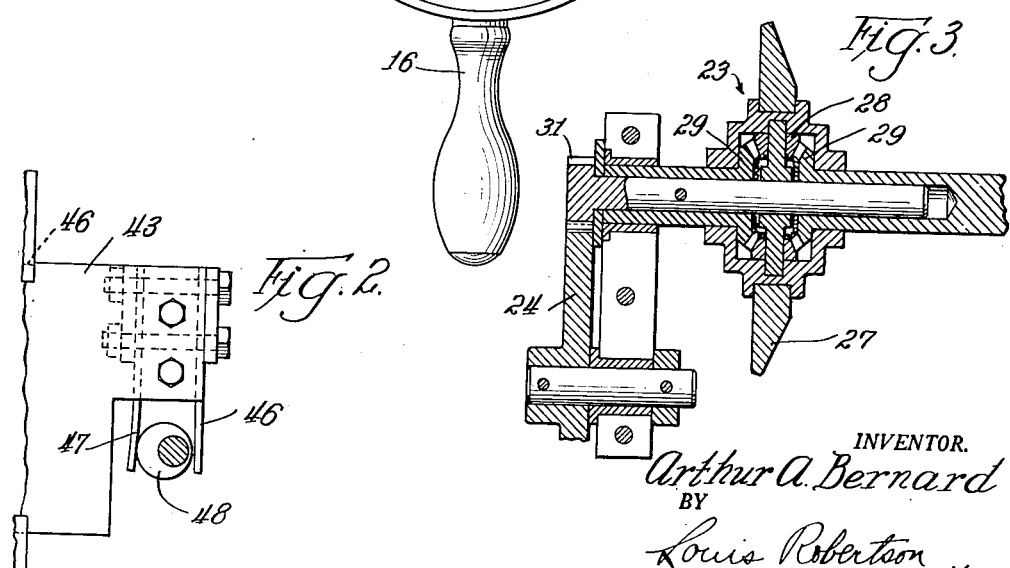
INVENTOR.
Arthur A. Bernard
BY Louis Robertson
Atty.

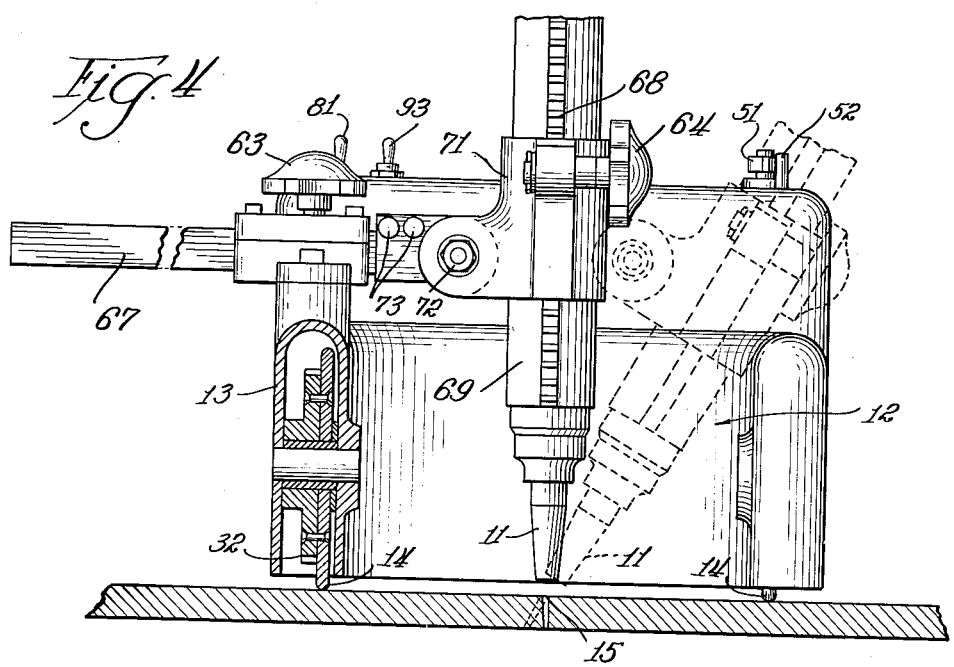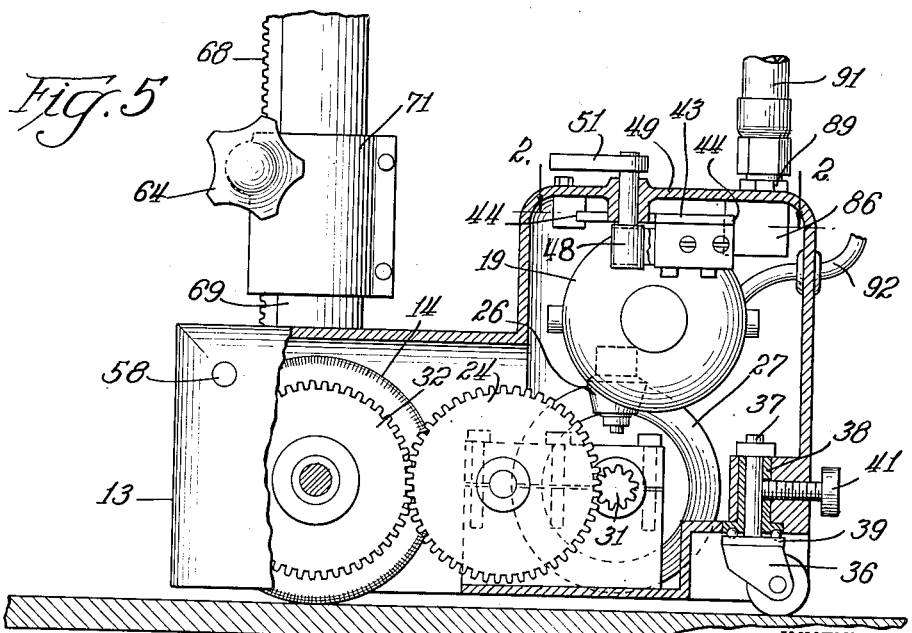

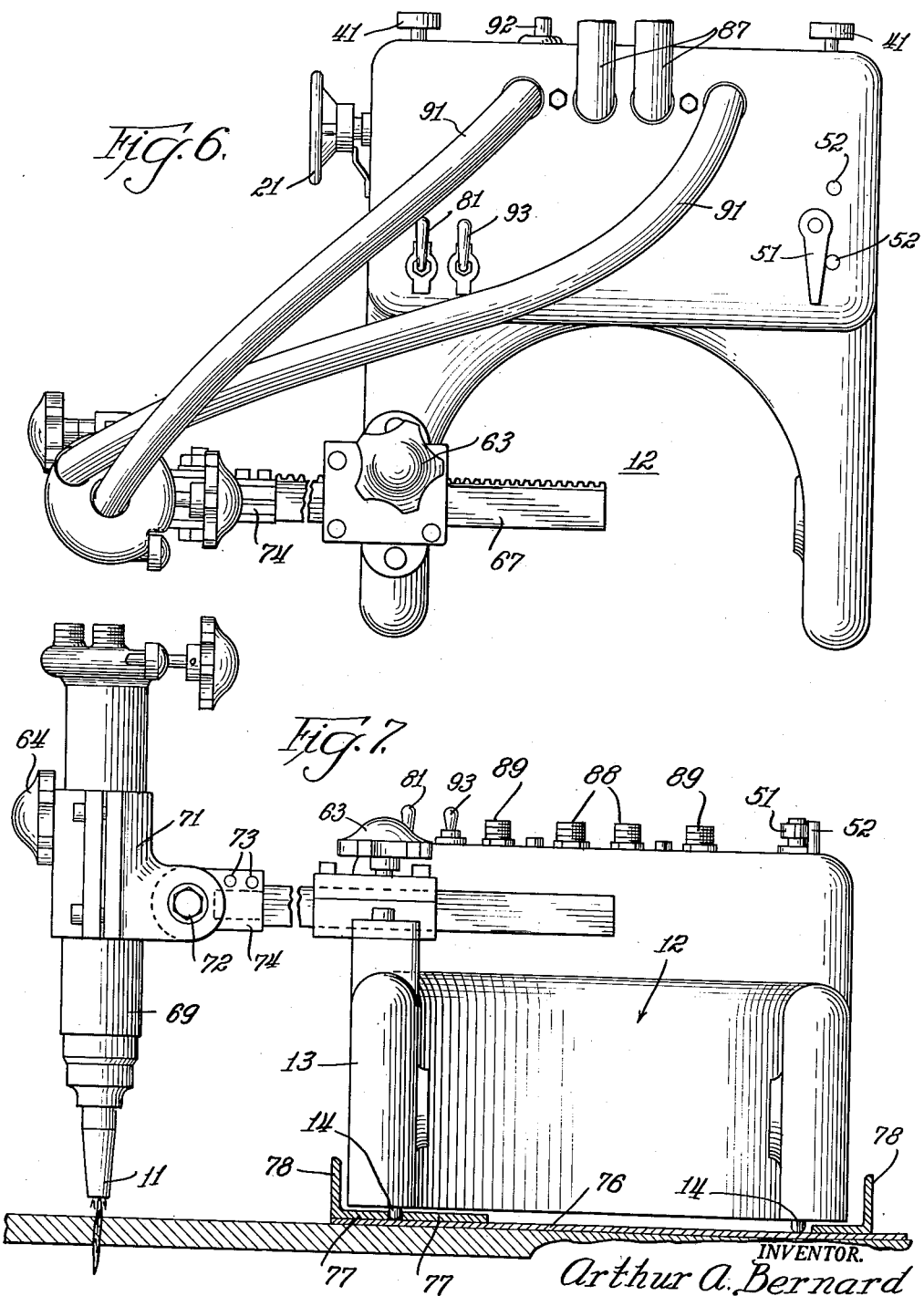

Patented Feb. 26, 1952

2,586,907

UNITED STATES PATENT OFFICE 2,586,907

PORTABLE SHAPE CUTTER

Arthur A. Bernard, Chicago, Ill.

Application June 3, 1948, Serial No. 30,867

6 Claims. (Cl. 266—23)

It is now common practice to cut steel plates and blocks by means of a cutting torch. This is a very efficient method of cutting steel plates and can be used on steel more than a foot thick. The torch can theoretically be moved along the steel by hand, but much better and more uniform results are obtained by mechanical movement. Machines can hold the torch at exactly the right angle and move it at exactly the right speed. The proper speed varies with the thickness of the steel being cut.

Elaborate and expensive machines have been provided in the past for torch cutting of steel. For some purposes they have been very satisfactory except for their cost. There is a tremendous need, however, for a less expensive cutting machine which can follow an intricate guide line accurately and with uniform movement.

There have been some portable machines in the past which were less expensive than the large stationary machines. By a portable machine is meant one which moves as an entirety along the work as distinguished from the stationary machines which may support the work on one part of the machine and move merely a part of the machine along the work, or move the work with respect to the cutting torch. Portable machines of the past have not been capable of following all kinds of intricate contours easily and with a uniform speed of cut. The speed could be set accurately for a straight cut or a cut on a continuous arc or throughout a complete circle. Generally speaking, any departure from the predetermined single course of movement would result in a change of speed of the cutting torch. Thus if the speed of the drive wheels was correct for a straight cut with the torch moving at the same speed as the machine, it is apparent that a torch mounted on one side of the machine would either increase or decrease its speed with respect to that of the wheels as the machine moved around a curve, depending on whether the torch was on the inside or the outside of the curve.

In the case of very sharp curves or angles, it was usually necessary to shut off the torch, readjust or shift the machine, and re-light the torch. Considering a right angle cut, for example, the machine would operate correctly along a straight line approaching the angle. As the torch reached the angle, however, there was no way to quickly and accurately shift the machine so that it would move in the new direction, with the torch remaining substantially stationary so that it would start in the new direction from the angle and make no false cuts during the shifting of the machine. An attempt to simply slide the wheels around along the surface of the work piece would inevitably shift the torch so that it might spoil the work piece, and hence this was not done.

According to the present invention, a very simple, relatively inexpensive machine is provided which moves the torch always at uniform speed no matter how intricate the contour. An operator can swing it around to change its direction without changing the speed of movement of the torch or the position of the torch. This is accomplished by positioning the torch so that it is directed at a point on the work midway between two driving wheels which are driven through a differential unit. The differential unit produces a constant forward movement of the torch whether this path is straight, curved or varied. It also restricts any swinging movement of the machine, as it is swung manually to follow a contour, to movement about a vertical axis through the point toward which the torch is directed. Thus as the torch reaches an angle on the contour to be cut, the operator may swing the machine by its handle with the result that in a fraction of a second he can swing the machine about the cutting torch, the cutting torch remaining substantially unmoved during the swinging movement, so that the subsequent forward drive of the drive wheels will move the torch from almost the exact point of the angle. Of course the net forward drive of the wheels continues during the swinging movement, but the swinging movement is too fast for this to produce any objectionable movement of the torch.

Additional objects and advantages of the invention will be apparent from the following description and from the drawings, in which:

Figure 1 is a top view of the apparatus chosen for illustration of the invention, some parts being omitted or broken away for clarity.

Fig. 2 is a partly sectional detail view on a larger scale showing the eccentric for sliding the motor and engaging the clutch.

Fig. 3 is a fragmentary sectional view also on a larger scale showing particularly the differential gear unit.

Fig. 4 is a front view of the apparatus with parts removed or broken away for clarity and showing in dotted lines an alternative position of the cutting torch.

Fig. 5 is a side view of the apparatus mainly broken away to show a sectional view approximately along the line 5—5 of Fig. 1.

Fig. 6 is a plan view of the apparatus rearranged for a different position of the cutting torch.

Fig. 7 is a front view of the apparatus shown in Fig. 6 showing also a track for guiding the cutting machine.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

The apparatus chosen for illustration is shown in Fig. 1 approximately with the arrangement which will most commonly be used. Thus the cutting torch 11 (seen best in Fig. 4) is positioned in the middle of a large opening 12 formed by a frame 13. The frame 13 is driven by wheels 14 and may be swung by a handle 16 to face in any direction. Fig. 1 also illustrates a radius rod 17 for guiding the apparatus about a center pin 18, but these would ordinarily be removed, being used only for relatively rare arcuate cuts.

Location of the cutting torch

An important feature of the present invention is that the cutting torch 11 is located so that its cutting action takes place at the radius point 15 around which the complete machine rotates as it is swung to the right or left by means of the handle 16 when traveling the course of an irregular line, as described below. This position of the torch has been made possible by extending the two drive wheels 14 forward from the main body of the frame 13, thus providing the opening 12 between them for the torch.

Constant speed drive

The wheels 14 are driven by a motor 19, the speed of which can be controlled by a speed control device represented more or less diagrammatically by knob 21. This knob may operate a rheostat 22 or any other speed control device. As a matter of fact, there may be a plurality of speed control devices, one for selecting an approximate range of speeds and another, such as rheostat 22, for making a delicate speed selection within the range.

For maximum efficiency, the flame of the torch should move with uniform speed. An important advantage of the present invention is in accomplishing this, regardless of the path followed by the machine. A key to the accomplishment is driving the wheels 14 aligned with the torch 11 through a differential gear unit 23. As a result of this drive, the average speed of the two wheels 14 will be constant whether the machine is moving along a straight line, a curved line, or a very irregular line. The torch 11, being located midway between the two wheels 14, moves at this average speed.

Although wide variations are possible in the manner in which the wheels 14 are driven through a differential, it is necessary that space be left for locating the torch as indicated. In the illustrated form this is accomplished in part by connecting the wheels 14 to the differential unit by intermediate spur gears 24, so that the differential is spaced from the turning axis through point 15. The spur gears may be replaced by chain drives. This arrangement of drive also permits the parts of the machine to be sufficiently isolated from the flame to avoid damage due to the heat thereof. Although isolation is necessary, it may be by distance, insulation, or both.

Accordingly, the illustrated form of drive may be traced as follows:

The motor 19 through a built-in gear box drives a friction drive cone 26 (seen best in Fig. 5). The drive cone 26 is pressed against friction wheel 27 during the operation of the machine. Friction wheel 27 is connected by the planetary structure of the differential unit 23. In other words, the friction wheel 27 drives bevel gears 28 in a planetary manner about the axis of the differential unit. The planetary bevel gears 28 mesh with bevel gears 29, each of which drives one of the wheels 14. Thus each bevel gear 29 is directly connected to a pinion 31 which drives one of the spur gears 24, which in turn drives a spur gear 32 mounted directly with its associated drive wheel 14.

From the foregoing arrangement it is apparent that the two wheels 14 maintain a constant average speed. It is nevertheless possible to swing the machine rapidly to move at an angle to that at which it has just moved. When this is done, one of the wheels 14 will rotate backwards, but the other one will have a compensating excess forward speed. If it be assumed that the motor momentarily stops so that the friction wheel 27 is held stationary, the machine would be swung about a stationary vertical axis comprising the axis of the torch 11. In other words, the differential unit operating through the drive wheels 14 would restrict the movement to rotation about this axis unless excessive force were applied so as to slide the wheels. In actual use the axis moves slightly during the swinging movement. However, the manual swinging movement need take only a fraction of a second and hence, at ordinary cutting speeds, the movement of the axis, and hence the movement of the torch, during the swinging operation is negligible.

In order for the device to swing freely about the torch, it must be free to move in all directions except as limited by the drive wheels 14 connected through the differential. To this end the rear end of the machine is supported by one or more swivel casters 36. The casters may be of conventional form and may, for example, each include a spindle 37 journaled in a bushing 38 of bronze or other suitable bearing material. The weight of the machine is preferably carried by anti-friction bearings 39. If desired, thumb screws 41 may be provided for locking the spindles 37 when a track is used. By such locking of spindles 37 the machine may also be left to run by itself on a straight course or uniform arc without track, although a track or radius rod will provide greater accuracy for long, unattended runs.

At present it is preferred to have two positions for a caster 36 positioned as indicated by the spindles 37 shown in dotted lines in Fig. 1. In practice, one caster will usually be omitted so that surface irregularities cannot raise one drive wheel from the work. The distribution of weight should be such as to maintain adequate traction at both drive wheels.

Clutch control

A clutch control for engaging or disengaging the motor 19 to the drive mechanism is provided by movably mounting the motor 19 and its associated friction drive cone 26. Thus the drive cone 26 and the friction wheel 27 comprise a clutch which is disengaged by separating one from the other. As seen best in Fig. 5, the motor 19 and its drive cone 26 are carried by a slide plate 43 which slides in slideways 44. As seen best in Fig. 2, the plate 43 also carries arms 46 and 47, at least the latter of which is preferably flexible. A cam or eccentric 48 is positioned between these arms, being carried by the cover portion 49 of the frame, and is controlled by a hand lever 51. With the hand lever against one of the stop pins 52, the eccentric 48 will be in the position shown in Fig. 2, pressing the drive cone 26 against the friction wheel 27. The proportions are preferably such that the arm 47 is flexed slightly to maintain the driving pressure between clutch members 26 and 27 resiliently. Of course resiliency may also or alternatively be provided by the surface portions of these clutch members, the surface portion of cone 26 preferably being a reasonably soft rubber.

When the lever 51 is turned against the other stop 52 the eccentric 48 will bear against the arm 46 and move the drive cone 26 away from drive wheel 27. This not only discontinues the driving operation, but it also frees the drive wheels 14 from the restraint of the motor 19 so that the machine may be manually moved to any desired position.

Mounting of handle

The handle 16 may be very simply mounted by a bail 56 at each end of which may be carried a pin 57 which fits holes 58 in the front of the frame 13. The pins 57 may be sprung into place by flexing the bail 56. In order to keep the handle 16 from dropping down upon the work, studs 59 may be carried by the frame against which the bail 56 will rest. This also permits the operator to increase the friction of the drive wheels 14 on the work when he is swinging the machine by pressing down on the handle 16.

A handle may be mounted elsewhere if desired, as for example at the opposite end of the machine either at the center thereof or at the two corners thereof. This handle may be similar to handle 16 or may be a long, inclined handle adapted to be operated by a person walking on the sheet metal being cut. In this event casters 36 may not be necessary.

The handle 16 will usually be removed by flexing its bail 56 before the radius rod 17 is applied. The radius rod 17 may then pass all the way through one of the holes 58 and may be secured therein by a set screw 61.

Bevel cutting

As seen in the dotted line position of the torch 11 in Fig. 4, the apparatus may be used very satisfactorily for bevel cutting. Again the torch may be directed toward a point midway between the bottoms of the drive wheels 14 so that the speed of cut will be uniform. Furthermore, the bevel is always at the right angle because the machine is constantly swung to keep the machine facing along the line of cut or tangent to a curved line so that the torch will lie in a vertical plane perpendicular to the line of cut.

The torch is shifted between the full line and dotted line positions of Fig. 4 by adjustment knobs 63 and 64. The knob 63 turns a pinion engaging teeth 66 on rack arm 67 to shift this arm laterally of the machine. Knob 64 turns a pinion which engages teeth 68 on torch tube 69 for raising and lowering the torch. The torch tube 69 runs through a yoke 71 which is pivotally carried by the arm 67 and may be locked in any position by tightening nut 72.

With wide bevel cutting more time is required for the outer part of the bevel around a curve than for the inner part. The extreme condition is found at corners. There it would usually be found best to snap the motor control switch 81 to the "off" position so as to stop the machine as it reaches the corner, and then swing the machine slowly enough so that it cuts the lower part of the bevel, before again snapping the switch 81 to start the machine in the new direction. It will be observed that during this time the stationary motor 19 and its reduction gears and drive cone 26 act as a lock against the friction wheel 27 so that the planetary mechanism still confines the swinging movement of the machine to movement about an axis through a midpoint between the wheel bottoms.

There may be occasions when it will be preferred to so direct the torch that the beveled cut will be positioned at its bottom midway between the wheels 14. In this event the mark on the work along which the operator will guide the torch would still be positioned along the intended upper edge of the bevel but at corners the mark would be carried beyond to a point directly over the lower intended edges of the bevel. Thus the operator would move the machine to cut the entire bevel to its lower corner, then quickly swing the machine without shutting off the motor. This would pivot the machine about the lower corner of the bevel so that it would then cut the bevel in a new direction and produce a square-cornered bevel. This arrangement would have the advantage that on curved cuts the speed would be correct for the lower part of the bevel and hence would never need to be readjusted except for a concave curvature. Concave curvatures occur less often than convex curvatures.

Outside mounting of torch

Under some circumstances, for example when using a track, it may be desirable to mount the torch on the outside of the machine as seen in Figs. 6 and 7. This can be accomplished by loosening bolts 73 to loosen fitting 74 and remove this fitting from arm 67. The arm 67 may then be withdrawn from the machine and restored in the opposite relation, as shown in Fig. 6, whereupon the fitting 74 may again be applied to arm 67.

Track

When desired the machine may be driven along a suitable track which will maintain its course accurate to a predetermined path. The track may comprise a base plate 76 and wheel direction plates 77. Flanges 78 are usually provided for stiffness of the track where it is not supported by work throughout. The wheels of casters 36, with spindles 37 locked by thumb screws 41, should follow directly behind the drive wheels 14 and fit within the guide grooves provided by the track to ensure smooth movement of the machine.

Only the guides 77 are required and hence it is possible, when desired, to use a track on only one side of the machine. This permits using a track without shifting the torch from its preferred position in Fig. 1 when desired. In that event the plate 76 of course would not extend inwardly beyond the inner guide 77, and both the inner guide 77 and the plate 76 might terminate quite close to the guided wheel 14.

*Supply connections*

Although the gas and electrical supply connections may be considerably varied, it is noted that in the illustrated form a block 86 in which one of the slideways 44 is cut serves also for the hose connections. As seen best in Figs. 6 and 7, supply hoses 87 may conveniently take the two center nipples 88, each of which is connected to one of the outer nipples. Although these nipples could be differently positioned they preferably extend upwardly so that the supply lines can extend downwardly from above for maximum freedom of movement. Each of nipples 88 is connected through block 86 to one of the side nipples 89, each of which is connected to a hose 91 leading to the torch.

It will probably be most convenient for the two supply hoses 87 to be tied together in some way, in which case the electrical supply cord 92 may be included in the strand and it may conveniently enter the frame 13 at any suitable point. No attempt has been made to show the various electrical connections within the frame or casing. It may be noted, however, that in addition to the "on" and "off" switch 81 already mentioned, there should be a reversing switch 93. For some angular cuts it may seem more convenient to swing the machine in one direction and reverse it, than to swing it in the other direction and have it continue to run forwardly.

From the foregoing it is seen that a simple and relatively inexpensive cutting machine has been provided which can easily be operated to move the cutting torch or the like along a line of any contour with a speed which remains constant in spite of variations in the contour. It can be operated to follow any intricate contour without the necessity for shutting off the torch in order to re-position the machine. In fact, for most cutting it is not even necessary to shut off the motor and it may instead be allowed to continue driving the machine at the most efficient cutting speed for the particular piece being cut.

I claim:

1. A portable shape following machine including a frame having spaced forward extensions forming a gap therebetween, a drive wheel individually mounted on each extension and spaced from the gap by a wall of the frame adjacent the wheel, one of said forward extensions having an apertured arm holder associated therewith, a torch-supporting arm extending through said aperture, a straight line torch carried by said arm, said arm being adapted for optionally positioning said torch directed in a vertical line toward a point midway between the bottoms of the wheels, directed toward said point along a line inclined to the vertical but lying in a vertical plane coinciding with the axis of the wheels, or directed toward a point on the other side of said extension from the gap, all parts of the frame being substantially as far from the torch as the walls adjacent the wheels, a motor carried by said frame with its axis extending transversely of the frame, a differential gear unit carried by said frame to the rear of said gap adjacent to the motor and including a planetary gear driven by said motor and side gears meshing with the planetary gear, means extending forwardly through the frame extensions connecting each wheel with one side gear to be driven thereby, a handle carried by the frame for turning the machine about said point while other movement is controlled by the differential unit, and a swiveled roller for supporting the rear part of the frame and facilitating its movement in any direction; visibility of said point being substantially unobstructed unless by said torch from all positions on lines extending upwardly from said point at elevations of 45 degrees to 75 degrees in a vertical plane extending directly forwardly from said point.

2. A portable shape following machine including a frame having spaced forward extensions forming a gap therebetween, a drive wheel individually mounted on each extension and spaced from the gap by a wall of the frame adjacent the wheel, one of said forward extensions having an apertured arm holder associated therewith, a torch-supporting arm extending through said aperture, a straight line torch carried by said arm, said arm being adapted for optionally positioning said torch directed in a vertical line toward a point midway between the bottoms of the wheels, directed toward said point along a line inclined to the vertical but lying in a vertical plane coinciding with the axis of the wheels, or directed toward a point on the other side of said extension from the gap, all parts of the frame being substantially as far from the torch as the walls adjacent the wheels, a motor carried by said frame, a differential gear unit carried by said frame to the rear of said gap and including a planetary gear driven by said motor and side gears meshing with the planetary gear, means extending forwardly through the frame extensions connecting each wheel with one side gear to be driven thereby, a handle carried by the frame for turning the machine about said point while other movement is controlled by the differential unit, and a swiveled roller for supporting the rear part of the frame and facilitating its movement in any direction; visibility of said point being substantially unobstructed unless by said torch from all positions on lines extending upwardly from said point at elevations of 45 degrees to 75 degrees in a vertical plane extending directly forwardly from said point.

3. A portable shape following machine including a frame having spaced forward extensions forming a gap therebetween, a drive wheel individually mounted on each extension and spaced from the gap by a wall of the frame adjacent the wheel, one of said forward extensions having an apertured arm holder associated therewith, a torch-supporting arm extending through said aperture, a straight line torch carried by said arm, said arm being adapted for optionally positioning said torch directed in a vertical line toward a point midway between the bottoms of the wheels, directed toward said point along a line inclined to the vertical but lying in a vertical plane coinciding with the axis of the wheels, or directed toward a point on the other side of said extension from the gap, all parts of the frame being substantially as far from the torch as the walls adjacent the wheels, a motor carried by said frame, a differential gear unit carried by said frame to the rear of said gap and including a planetary gear driven by said motor and side gears meshing with the planetary gear, means extending forwardly through the frame extensions connecting each wheel with one side gear to be driven thereby, a handle carried by the frame for turning the machine about said point while other movement is controlled by the differential unit, and a swiveled roller for supporting the rear part of the frame and facilitating its movement in any direction.

4. A portable shape following machine including a frame having spaced forward extensions forming a gap therebetween, a drive wheel individualy mounted on each extension and spaced from the gap by a wall of the frame adjacent the wheel, one of said forward extensions having an apertured arm holder associated therewith, a torch-supporting arm extending through said aperture, a straight line torch carried by said arm, said arm being adapted for optionally positioning said torch directed in a vertical line toward a point midway between the bottoms of the wheels, or directed toward said point along a line inclined to the vertical but lying in a vertical plane coinciding with the axis of the wheels, all parts of the frame being substantially as far from the torch as the walls adjacent the wheels, a motor carried by said frame, a differential gear unit carried by said frame to the rear of said gap and including a planetary gear driven by said motor and side gears meshing with the planetary gear, means extending forwardly connecting each wheel with one side gear to be driven thereby, a handle carried by the frame for turning the machine about said point while other movement is controlled by the differential unit, and a swiveled roller for supporting the rear part of the frame and facilitating its movement in any direction; visibility of said point being substantially unobstructed unless by said torch from all positions on lines extending upwardly from said point at elevations of 45 degrees to 75 degrees in a vertical plane extending directly forwardly from said point.

5. A portable shape following machine including a frame having spaced forward extensions forming a gap therebetween, a drive wheel individually mounted on each extension and spaced from the gap by a wall of the frame adjacent the wheel, one of said forward extensions having an apertured arm holder associated therewith, a torch-supporting arm extending through said aperture, a straight line torch carried by said arm, said arm being adapted for optionally positioning said torch directed in a vertical line toward a point midway between the bottoms of the wheels, or directed toward said point along a line inclined to the vertical but lying in a vertical plane coinciding with the axis of the wheels, all parts of the frame being substantially as far from the torch as the walls adjacent the wheels, a motor carried by said frame, a differential gear unit carried by said frame to the rear of said gap and including a planetary gear driven by said motor and side gears meshing with the planetary gear, means extending forwardly connecting each wheel with one side gear to be driven thereby, a handle carried by the frame for turning the machine about said point while other movement is controlled by the differential unit, and a swiveled roller for supporting the rear part of the frame and facilitating its movement in any direction.

6. A portable shape following machine including a frame in the form of a housing having a main body portion and spaced forward extensions forming a gap therebetween, a drive wheel individually mounted on and largely housed within each extension, one of said forward extensions having an apertured arm holder associated therewith, a torch-supporting arm extending through said aperture, a straight-line torch carried by said arm with vertical adjustability and having a tip at its bottom and a hose connection at its top in a straight line above the tip, said arm being adapted for positioning the torch directed optionally either in a vertical line toward a point midway between the bottoms of the wheels or directed toward said point along a line inclined to the vertical but lying in a vertical plane coinciding with the axis of the wheels, all parts of the frame being substantially as far from the torch as the walls adjacent the wheels, a motor within the main body of the housing, a differential gear unit within the main body of the housing and including a planetary gear driven by said motor and side gears meshing with the planetary gear, means extending forwardly into said forward extensions and connecting each wheel with one side gear to be driven thereby, a handle support carried by the frame, extending forwardly from the extensions, a handle thereon for turning the machine about said point while other movement is controlled by the differential unit and a swiveled roller adjacent the rear end of the frame for supporting the rear part of the frame and facilitating its movement in any direction, and means for releasing the planetary gear to move freely about the axis of the side gears for moving the machine with free manual control, all parts of said housing being sufficiently spaced from the torch to provide visibility toward said point from all directions at a given elevation in excess of 45 degrees except as the visibility is obstructed by said arm and, at higher elevations, by said torch.

ARTHUR A. BERNARD.

REFERENCES CITED

The following references are of record in the file of this patent:

UNITED STATES PATENTS

| Number | Name | Date |
|---|---|---|
| 1,118,183 | Bucknam | Nov. 24, 1914 |
| 1,932,641 | Scheidhauer | Oct. 31, 1933 |
| 2,038,820 | Anderson | Apr. 28, 1936 |
| 2,183,605 | Bucknam et al. | Dec. 19, 1939 |

FOREIGN PATENTS

| Number | Country | Date |
|---|---|---|
| 254,654 | Great Britain | July 8, 1926 |